United States Patent [19]

Bertschi

[11] Patent Number: 5,011,646
[45] Date of Patent: Apr. 30, 1991

[54] METHOD AND APPARATUS FOR INJECTION MOLDING USING A MOVABLE SPRUE BAR

[75] Inventor: Rene Bertschi, Toronto, Canada

[73] Assignee: Husky Injection Molding Systems Ltd., Bolton, Canada

[21] Appl. No.: 314,894

[22] Filed: Feb. 24, 1989

[51] Int. Cl.$^5$ .............................................. B29C 45/12
[52] U.S. Cl. ........................... 264/297.2; 264/328.11; 425/572; 425/574; 425/588
[58] Field of Search ............. 264/161, 328.1, 328.8, 264/328.11, 297.2; 425/567, 572, 588, 574, 581, DIG. 221

[56] References Cited

U.S. PATENT DOCUMENTS

| | | | |
|---|---|---|---|
| 4,212,626 | 7/1980 | Gellert | 425/562 |
| 4,539,171 | 9/1985 | Sorensen | 264/328.8 |
| 4,586,887 | 5/1986 | Gellert | 425/570 |

FOREIGN PATENT DOCUMENTS

| | | | |
|---|---|---|---|
| 49-4067 | 1/1974 | Japan | 425/588 |
| 62-233215 | 10/1987 | Japan | 425/588 |

Primary Examiner—Jill L. Heitbrink
Attorney, Agent, or Firm—Bachman & LaPointe

[57] ABSTRACT

A method and apparatus for injection molding thermoplastic material including a stack mold and an injection unit with a movable sprue bar communicating with the runner system. The sprue bar is releasably engaged with the runner system by relative movement in a direction perpendicular to the horizontal central axis of the stack mold.

15 Claims, 2 Drawing Sheets

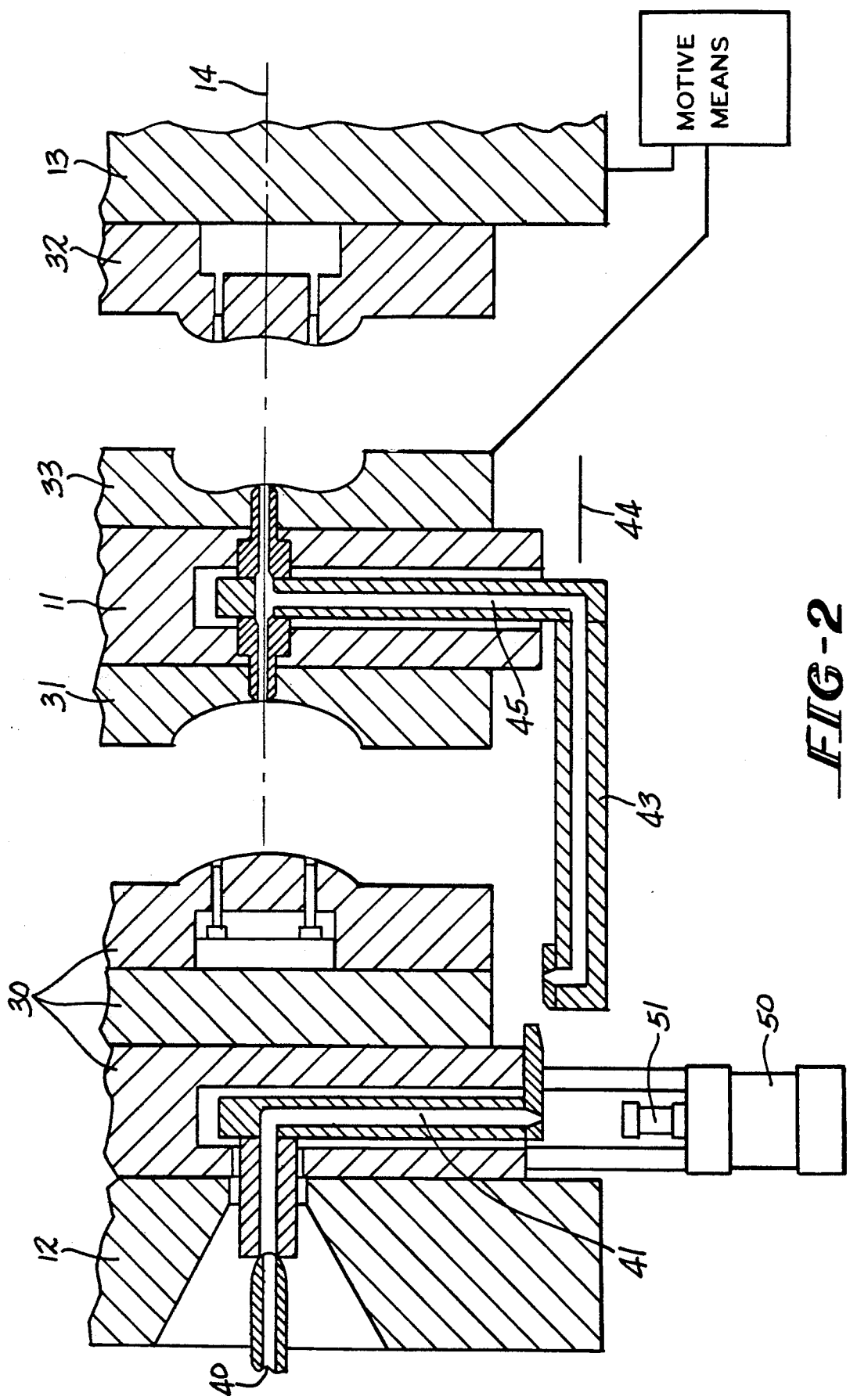

METHOD AND APPARATUS FOR INJECTION MOLDING USING A MOVABLE SPRUE BAR

BACKGROUND OF THE INVENTION

The present invention relates to injection molding and more particularly to a stack mold configuration utilizing a movable sprue bar.

Stack molding provides the advantage that it enables an injection molding machine output to be doubled without significantly increasing its size. Stack mold configurations generally employ a stationary first platen, a movable center platen and a movable second platen. The cavities are conventionally located on opposing faces of the movable center platen. Advantageously, the same machine forces are applied to two cavities in series rather than to a single cavity. However, stack molding has the disadvantage that the melt runner system must extend through the moving center platen in order to reach the cavities.

Conventionally, multi cavity stack molds use a sprue bar which is a direct channel between the machine's extruder nozzle and the molds hot runner distributor mounted in the center section of the stack mold. In the case of large parts, one part being mounted on either side of the stack molds center platen, the part nearest the machine's extruder prevents the use of a conventional sprue bar. Therefore, an alternate means of conveying the resin to the center section must be devised.

U.S. Pat. No. 4,539,171 to Sorensen utilizes the a snorkel device which is essentially a sprue bar offset from and parallel to the central axis of the clamping platens. The snorkel of the '171 patent is attached to the stack molds hot runner and makes a seal with the injection molding machine's extruder nozzle by the action of the clamp closing the mold. This design is characterized by several disadvantages. Firstly, the machine's nozzle must be specially modified to extend its channel to the offset position chosen for the snorkel. In addition, a hole must be made in the stationary platen through which the snorkel and the extended nozzle may pass. Therefore, the design of the '171 patent requires expensive machine modifications.

There is an additional disadvantage of the design of the '171 patent that the action of sealing the sprue bar against the machine nozzle changes the clamping force applied to the half of the stack mold next to the extruder. This is a disadvantage shared by all conventional centrally mounted sprue bars. Thus, for example, the force required to maintain the nozzle to sprue bar seal is typically 20 tons and is usually applied by a hydraulic cylinder means acting between the extruder assembly and the stationary platen. This force is directly opposing the main clamping force applied between the machine's two platens attempting to keep the stack mold closed during injection. This main clamping force, for example, is typically 500 tons. Because the 20 ton force required to maintain the nozzle to sprue bar seal is transmitted directly to the center section of the stack mold it effectively subtracts 20 tons from the clamping force acting on the mold set next to the extruder and adds 20 tons to the mold set next to the moving platen. Thus, the two halves of the stack mold see 480 tons and 520 tons respectively. Consequently, disadvantageously, the filling of the two halves is not symmetrical.

U.S. Pat. No. 4,212,626 and 4,586,887, both to Gellert show a means to convey the resin to the parts by eliminating the sprue bar and making the channel seal at the molds parting line nearest the extruder. In the '626 patent the resin is fed through a first part 76 to a second part 78. Closing the resin channels to prevent disadvantageous drooling is achieved by means of valve gates at each surface. Hence, three valve gate nozzles are used. In the '887 patent a conventional multi-cavity stack mold is shown where the sprue bar is replaced with a nozzle. The nozzle seals to a hot runner manifold bushing at the parting line of the part nearest the machine's extruder. The channels are not closed at the parting line after the resin has been conveyed, instead a valve gate is used to close the hot runner manifold inlet channel. The design of both the '626 and '887 patent have the disadvantage of allowing drool to escape on the parting line surface. This is a considerable disadvantage. No matter how efficient the valve gates are in the '626 patent, or the fact that machine suckback may be employed to decompress the molds hot runner manifold, in both patents a small amount of drool will in fact escape. This cannot be tolerated at the parting line since it prevents complete mold closing and allows flashing to occur. Continued operation of the mold with slight drool causes permanent damage requiring expensive repairs.

An additional method is shown in Kunstoffe, June 1988 "Development and Construction of a Stack Mold" Pages 505-510, By R. Strauch. This design utilizes a sprue bar displaced from the mold center line and clamped at both ends to part of the molds hot runner system. The machine nozzle seals to a bush conventionally and resin is conveyed via a first manifold through a permanent seal to the sprue bar, and through a second permanent seal to the second manifold in the stack mold center section. This design has the advantage of being able to be installed in an unmodified machine, however, it suffers from the disadvantage that the ejector stroke and opening stroke for the part nearest the machine's extruders is severely limited. The ejector mechanism is incorporated within the mold structure on the core half of the mold. In accordance with this design, the strokes must be built into the shut height of the mold, and this severely limits the height of the parts that can be molded in this way in an unmodified machine.

Accordingly, it is a principal object of the present invention to provide an improved injection molding method and apparatus.

It is a still further feature of the present invention to provide an improved injection molding method and apparatus a aforesaid employing a stack mold configuration and utilizing a movable sprue bar.

It is a still further object of the present invention to provide an improved method and apparatus as aforesaid which is inexpensive and convenient to build and operate and which overcomes the disadvantage of differential clamping force applied to each half of a stack mold.

Further objects and advantages of the present invention are appeared hereinbelow.

SUMMARY OF THE INVENTION

In accordance with the present invention the foregoing objects and advantages can be readily obtained.

The injection molding apparatus of the present invention comprises: a stationary first machine platen and a movable second machine platen; a stack mold comprising a movable center section, at least one first mold cavity between the first platen and center section, at least one second mold cavity between the second platen and center section, said stack mold having a horizontal central axis; an injection unit comprising an injection nozzle, a first runner system communicating with the injection nozzle located in the first platen, a nozzle sprue bar communicating with the first runner system, and a second runner system communicating with the sprue bar located in the center section and communicating with the first mold cavity and the second mold cavity; and means to releasably engage the sprue bar with the runner system, preferably with the first runner system, by relative movement in a direction perpendicular to the horizontal center axis of the stack mold. The injection molding apparatus of the present invention has a front, rear, top and bottom, and the sprue bar is preferably located to the rear of the stack mold so that any drool will form harmlessly behind the stack mold and will not fall within the mold parting line surfaces. It is a considerable advantage of the present invention that because the sealing action of the sprue bar with the first runner system occurs by a motion perpendicular to the clamping axis and not by the action of closing the clamp, there is no difference in the clamping force applied to each half of the stack mold. This overcomes the disadvantage of unsymmetrical filling of the two halves of the stack mold.

The improved method of the present invention comprises: providing a stationary first machine platen and a movable second machine platen; providing a stack mold having a horizontal central axis, a movable center section, at least one first mold cavity between the first platen and center section and at least one second mold cavity between the second platen and center section; injecting plastic material into said mold cavities via an injection nozzle, a first runner system communicating with the injection nozzle located in the first platen, a movable sprue bar communicating with the first runner system and a second runner system communicating with the sprue bar located in the center section; and relatively moving said sprue bar and said runner system and preferably relative the first runner system, to engage and disengage said sprue bar and runner system by relative movement in a direction perpendicular to the horizontal central axis of the stack mold.

BRIEF DESCRIPTION OF THE DRAWINGS

FIG. 2 is a plan view of the injection molding apparatus of FIG. 1 in the open position.

DETAILED DESCRIPTION

Figure 1:
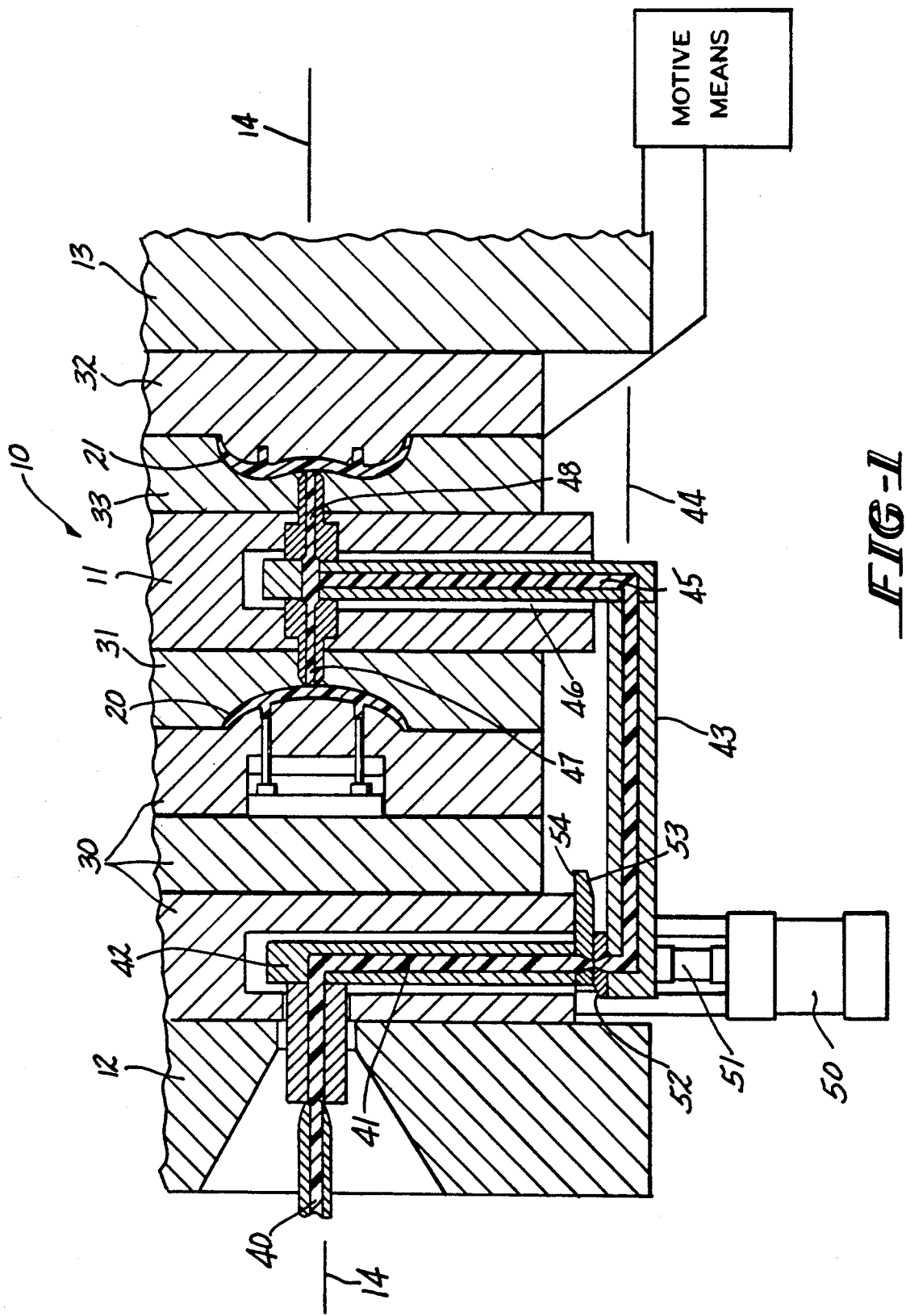
FIG. 1 is a plan view of the injection molding apparatus of the present invention in the closed position showing two parts in the mold cavities.

Stack mold 10 includes a movable center section or plate 11. Stationary first machine platen 12 and a movable second machine platen 13 are provided on either side of the stack mold. Stack mold 10 has a horizontal central axis or clamp axis 14. Mold cavities 20 and 21 are located on opposing faces of movable center section 11, with the first mold cavity 20 positioned between the first platen 12 and center section 11 and the second mold cavity 21 positioned between the second platen 13 and center section 11. Thus, the first mold set includes core half 30 affixed to first platen 12 by means not shown, cavity half 31 affixed to center section 11 by means not shown and first mold cavity 20. The second mold set includes core half 32 affixed to second platen 13 by means not shown, cavity half 33 affixed to center section 11 by means not shown and second mold cavity 21.

Injection molding machine extruder nozzle 40 seals against and communicates with a first hot runner system 41 in a first hot runner manifold 42 mounted in core half 30 of the first mold set. Movable sprue bar 43 is positioned to the rear of stack mold 10 with its main axis 44 parallel to the stack mold clamp axis 14. FIG. 1 shows stack mold 10 in the closed position with sprue bar 43 communicating with first runner system 41. Sprue bar 43 communicates with second runner system 45 located in second runner manifold 46 and is permanently attached thereto. The second runner manifold 46 is mounted in center section 11. The second runner system distributes the resin to mold cavities 20 and 21 via branches 47 and 48, respectively.

Sprue bar 43 is releasably held against first manifold 42 by hydraulic cylinder 50 operating piston 51. Naturally, other suitable means may be employed to releasably engage the sprue bar with the first manifold. This insures a tight seal between sprue bar 43 and first runner system 41 to resist the injection pressure of the resin inside the first manifold as it is being conveyed to the molds.

Extruder 40 completes the injection of resin to mold cavities 20 and 21 via first runner system 41, sprue bar 43, second runner system 45 and branches 47 and 48. Naturally, the molded parts may be the same or different.

After injection is complete extruder "suckback" normally takes place. Extruder suckback is when the injection piston in the extruder is retracted slightly while the machine nozzle is still sealed against the mold manifold. The purpose of this is to depressurize the molds hot runner system so that when the mold is opened resin will not drool from the gates or the open channel of the first manifold 42.

After the extruder has "sucked back" sprue bar 43 is released by de-energizing cylinder 50. Stack mold 10 is then opened by known means, shown schematically as motive means, and center section 11 and second platen 13 travel away from first platen 12 as shown in FIG. 2. The molded parts are ejected from the open mold cavities in a conventional manner. Sprue bar 43 permanently affixed to center section 11 travels with the center section, also as shown in FIG. 2.

It should be noted that the location of the sprue bar at the rear of the stack mold leaves top, bottom and front of the stack mold free and clear for free drop of parts and operator access.

When the stack mold is closed for the next shot, the sprue bar 43 is guided into location by sprue bar ramp 52 acting on first manifold ramp 53 on guide block 54. Naturally, other means may be provided for guiding the sprue bar into location adjacent the first runner system.

Thus, it can be readily seen that the present invention obtains significant advantages. The self contained displaced sprue bar system can be used with stack molds in non-modified machines. Although the shut height of the mold is increased by the extra thickness of the first manifold construction, there is no other penalty applied to shut height or opening stroke of the machine. Also, generally the system will not drool and even if some drool occurs, due to the positioning of the sprue bar along the back of the mold, the drool will fall down harmlessly and will not fall between the mold parting line surfaces.

In addition to the foregoing and significantly, because the sealing action of the sprue bar with the runner system occurs by a motion perpendicular to the clamp axis and not by the action of closing the clamp, there is no difference in the clamping force applied to each half of the stack mold and the filling of both mold sets is symmetrical.

Although the specific embodiment described above shows the sprue bar moving into and out of engagement with the first runner system, it should be appreciated that variations may be readily practiced. Thus, for example, the sprue bar may be permanently affixed to the first runner system and move into and out of engagement with the second runner system. Also, the runner system may be provided with extension means which move into and out of engagement with the sprue bar.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A method for injection molding a plastic material which comprises: providing a stationary first machine platen and a movable second machine platen; providing a stack mold having a horizontal central axis, a movable center section, at least one first mold cavity between the first platen and the center section, and at least one second mold cavity between the second platen and the center section; opening and closing said stack mold in a direction parallel to the horizontal central axis; injecting plastic material into said mold cavities via an injection nozzle, a first runner system communicating with the injection nozzle, a sprue bar communicating with the first runner system and a second runner system communicating with the sprue bar and located in the center section; and relatively moving said sprue bar and at least one of the first and second runner systems to engage and disengage the sprue bar and said at least one of the first and second runner systems by relative movement in a direction perpendicular to the horizontal central axis of the stack mold, wherein the engagement is sufficient to insure a tight seal between the sprue bar and said at least one of the first and second runner systems; and moving the sprue bar and stack mold relative to each other in a direction parallel to the horizontal central axis upon opening and closing the stack mold.

2. A method according to claim 1 including the step of moving said sprue bar into and out of engagement with the runner system by means of a hydraulic cylinder in a direction perpendicular to the horizontal central axis of the stack mold.

3. A method according to claim 1 including the step of positioning the sprue bar to the side of the stack mold.

4. A method according to claim 1 including the step of fixedly attaching the sprue bar to the second runner system.

5. A method according to claim 4 including moving said sprue bar relative said first runner system to engage and disengage the sprue bar and first runner system.

6. An injection molding apparatus for injection molding a plastic material which comprises: a stationary first machine platen and a movable second machine platen; a stack mold having a horizontal central axis, a movable center section, at least one first mold cavity between the first platen and center section and at least one second mold cavity between the second platen and the center section, wherein said stack mold opens and closes in a direction parallel to the horizontal central axis; an injection unit communicating with the mold cavities comprising an injection nozzle, a first runner system communicating with the injection nozzle, a sprue bar communicating with the first runner system and a second runner system communicating with the sprue bar located in the center section and communicating with the first and second mold cavities; and means to releasably engage the sprue bar with at least one of the first and second runner systems by relative movement of the sprue bar and said at least one of the first and second runner systems in a direction perpendicular to the horizontal central axis of the stack mold including means to insure a tight seal between the sprue bar and the at least one of the first and second runner systems; wherein said sprue bar and stack mold are movable relative to each other in a direction parallel to the horizontal central axis upon opening and closing the stack mold.

7. An apparatus according to claim 6 wherein said means to releasably engage is operative to releasably engage the sprue bar with the first runner system.

8. An apparatus according to claim 6 wherein the sprue bar is located to the side of the stack mold.

9. An apparatus according to claim 6 wherein said first platen is positioned adjacent a core half and said second platen is positioned adjacent a core half.

10. An apparatus according to claim 6 wherein the sprue bar has a main axis parallel to the horizontal central axis of the stack mold.

11. An apparatus according to claim 7 wherein the sprue bar is fixedly attached to the second runner system.

12. An apparatus according to claim 6 wherein said means to releasably engage the sprue bar includes a hydraulic cylinder.

13. An apparatus according to claim 7 including means for guiding the sprue bar into location adjacent the first runner system.

14. An injection molding apparatus for injection molding a plastic material which comprises: a stationary first machine platen and a movable second machine platen; a stack mold having a horizontal central axis, a movable center section, at least one first mold cavity between the first platen and center section and at least one second mold cavity between the second platen and the center section, wherein said stack mold opens and closes in a direction parallel to the horizontal central axis; an injection unit communicating with the mold cavities comprising an injection nozzle, a first runner system communicating with the injection nozzle, a sprue bar communicating with the first runner system and a second runner system communicating with the sprue bar located in the center section and communicating with the first and second mold cavities; and means to releasably engage the sprue bar with at least one of the first and second runner systems by relative movement of the sprue bar and said at least one of the first and second runner systems in a direction perpendicular to the horizontal central axis of the stack mold including means to insure a tight seal between the sprue bar and the at least one of the first and second runner systems; said apparatus including a first mold set with a core half, cavity half and first mold cavity, a second mold set with a core half, cavity half and second mold cavity, wherein the first runner system is located in the cavity half of the first mold set.

15. An injection molding apparatus for injection molding a plastic material which comprises: a stationary first machine platen and a movable second machine platen; a stack mold having a horizontal central axis, a movable center section, at least one first mold cavity between the first platen and center section and at least one second mold cavity between the second platen and the center section, wherein said stack mold opens and closes in a direction parallel to the horizontal central axis; an injection unit communicating with the mold cavities comprising an injection nozzle, a first runner system communicating with the injection nozzle, a sprue bar communicating with the first runner system and a second runner system communicating with the sprue bar located in the center section and communicating with the first and second mold cavities; and means to releasably engage the sprue bar with at least one of the first and second runner systems by relative movement of the sprue bar and said at least one of the first and second runner systems in a direction perpendicular to the horizontal central axis of the stack mold including means to insure a tight seal between the sprue bar and the at least one of the first and second runner systems; wherein the injection nozzle is located in the first platen.

* * * * *